(12) United States Patent
Komatsu

(10) Patent No.: US 9,770,989 B2
(45) Date of Patent: Sep. 26, 2017

(54) VEHICLE DISPLAY DEVICE

(71) Applicant: FUJI JUKOGYO KABUSHIKI KAISHA, Tokyo (JP)

(72) Inventor: Yusuke Komatsu, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/043,505

(22) Filed: Feb. 13, 2016

(65) Prior Publication Data

US 2016/0236571 A1 Aug. 18, 2016

(30) Foreign Application Priority Data

Feb. 17, 2015 (JP) .................................. 2015-028160

(51) Int. Cl.
*B60L 3/12* (2006.01)
*B60T 17/18* (2006.01)
(Continued)

(52) U.S. Cl.
CPC ............... *B60L 3/12* (2013.01); *B60L 1/003* (2013.01); *B60L 7/14* (2013.01); *B60L 7/26* (2013.01);
(Continued)

(58) Field of Classification Search
CPC .... B60L 3/12; B60L 1/003; B60L 7/14; B60L 7/26; B60L 11/14; B60L 11/1861;
(Continued)

(56) References Cited

U.S. PATENT DOCUMENTS

2009/0251303 A1* 10/2009 Kaneda .................. B60K 35/00
340/439
2012/0179319 A1* 7/2012 Gilman ............. B60W 50/0097
701/22

(Continued)

FOREIGN PATENT DOCUMENTS

| CN | 102307743 A | 1/2012 |
|---|---|---|
| JP | 2014-118816 A | 6/2014 |
| JP | 2014-136576 A | 7/2014 |

OTHER PUBLICATIONS

Office Action received for Japanese Patent Application No. 2015-028160, mailed on Jun. 14, 2016, 5 pages of office action including 3 pages of English translation.
(Continued)

*Primary Examiner* — Marthe Marc-Coleman
(74) *Attorney, Agent, or Firm* — Chip Law Group

(57) ABSTRACT

A vehicle display device is provided in an electric vehicle including a friction brake and includes: a loss energy calculation module that calculates a loss energy released from the electric vehicle on the basis of an actuation state of the friction brake; a consumption calculation module that calculates an energy consumption consumed by the electric vehicle on the basis of the loss energy; a first efficiency calculation module that calculates a first energy efficiency on the basis of a travel distance and an energy consumption in a first period; a second efficiency calculation module that calculates a second energy efficiency on the basis of a travel distance and an energy consumption in a second period shorter than the first period; and a display control module that controls a display content of an onboard display on the basis of an efficiency difference between the first and second energy efficiencies.

24 Claims, 5 Drawing Sheets

(51) Int. Cl.
| | |
|---|---|
| *G07C 5/02* | (2006.01) |
| *B60T 1/10* | (2006.01) |
| *B60T 13/58* | (2006.01) |
| *B60T 13/66* | (2006.01) |
| *B60T 17/22* | (2006.01) |
| *F16D 66/00* | (2006.01) |
| *B60L 1/00* | (2006.01) |
| *B60L 7/14* | (2006.01) |
| *B60L 7/26* | (2006.01) |
| *B60L 11/14* | (2006.01) |
| *B60L 11/18* | (2006.01) |
| *B60L 15/20* | (2006.01) |

(52) U.S. Cl.
CPC ........... *B60L 11/14* (2013.01); *B60L 11/1861* (2013.01); *B60L 15/2009* (2013.01); *B60L 15/2045* (2013.01); *B60L 15/2054* (2013.01); *B60T 1/10* (2013.01); *B60T 13/586* (2013.01); *B60T 13/662* (2013.01); *B60T 17/221* (2013.01); *F16D 66/00* (2013.01); *G07C 5/02* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/622* (2013.01); *B60L 2250/16* (2013.01); *B60L 2260/54* (2013.01); *B60T 2270/604* (2013.01); *Y02T 10/645* (2013.01); *Y02T 10/70* (2013.01); *Y02T 10/705* (2013.01); *Y02T 10/7005* (2013.01); *Y02T 10/7044* (2013.01); *Y02T 10/7077* (2013.01); *Y02T 10/7241* (2013.01); *Y02T 10/7283* (2013.01); *Y02T 10/7291* (2013.01); *Y02T 90/16* (2013.01); *Y02T 90/162* (2013.01); *Y10S 903/93* (2013.01)

(58) Field of Classification Search
CPC ............. B60L 15/2009; B60L 15/2045; B60L 15/2054; B60L 2210/40; B60L 2240/12; B60L 2240/421; B60L 2240/423; B60L 2240/441; B60L 2240/443; B60L 2240/622; B60L 2250/16; B60L 2260/54; B60T 1/10; B60T 13/586; B60T 13/662; B60T 17/221; B60T 2270/604; F10D 66/00; G07C 5/02; Y10S 903/93
USPC ............... 701/22, 123; 340/439, 455, 450.2; 180/65.1, 65.2, 65.265
See application file for complete search history.

(56) References Cited

U.S. PATENT DOCUMENTS

| | | |
|---|---|---|
| 2014/0200793 A1 | 7/2014 | Dufford |
| 2014/0277874 A1* | 9/2014 | Crombez .............. B60W 10/06 701/22 |
| 2015/0151638 A1* | 6/2015 | Tagawa .............. G01C 21/3469 701/22 |

OTHER PUBLICATIONS

Office Action Received for Chinese Patent Application No. 201610087212.7, dated on May 27, 2017, 6 Pages of Office Action.

\* cited by examiner

VEHICLE DISPLAY DEVICE

CROSS-REFERENCE TO RELATED APPLICATIONS

The present application claims priority from Japanese Patent Application No. 2015-028160 filed on Feb. 17, 2015, the entire contents of which are hereby incorporated by reference.

BACKGROUND

1. Technical Field

The present disclosure relates to a vehicle display device that is provided in an electric vehicle including a friction brake.

2. Related Art

As electric vehicles, electric cars and fuel-cell cars including an electric motor serving as a power source have been developed. Hybrid vehicles including an engine and an electric motor serving as power sources have also been developed as electric vehicles. Furthermore, as hybrid vehicles, so-called plug-in hybrid vehicles that allow charging with an external power source have been developed. A driver's driving operation is important for improving the electricity cost and fuel cost of these electric vehicles. Thus, a vehicle display device that displays a difference between the current instantaneous fuel cost and the past average fuel cost on a meter and encourages a driver to perform appropriate driving operation has been devised (see Japanese Unexamined Patent Application Publication (JP-A) No. 2014-118816).

The vehicle display device disclosed in JP-A No. 2014-118816 displays a difference between an instantaneous fuel cost and an average fuel cost. Therefore, excellent fuel cost keeps being displayed in motor travel and vehicle braking, during which an engine is stopped. However, to improve the energy efficiency, such as electricity cost and fuel cost, of an electric vehicle, it is important to encourage a driver to perform driving operation that contributes to improved energy efficiency in motor travel and vehicle braking as well.

SUMMARY OF THE INVENTION

An object of the present disclosure is to encourage a driver to perform driving operation that contributes to improved energy efficiency.

A vehicle display device according to an aspect of the present disclosure is a vehicle display device for an electric vehicle including a friction brake, the vehicle display device including: a loss energy calculation module that calculates a loss energy released from the electric vehicle on the basis of an actuation state of the friction brake; a consumption calculation module that calculates an energy consumption consumed by the electric vehicle on the basis of the loss energy; a first efficiency calculation module that calculates a first energy efficiency on the basis of a travel distance and an energy consumption in a first period; a second efficiency calculation module that calculates a second energy efficiency on the basis of a travel distance and an energy consumption in a second period that is shorter than the first period; and a display control module that controls a display content of an onboard display on the basis of an efficiency difference between the first energy efficiency and the second energy efficiency.

DETAILED DESCRIPTION

Figure 1:
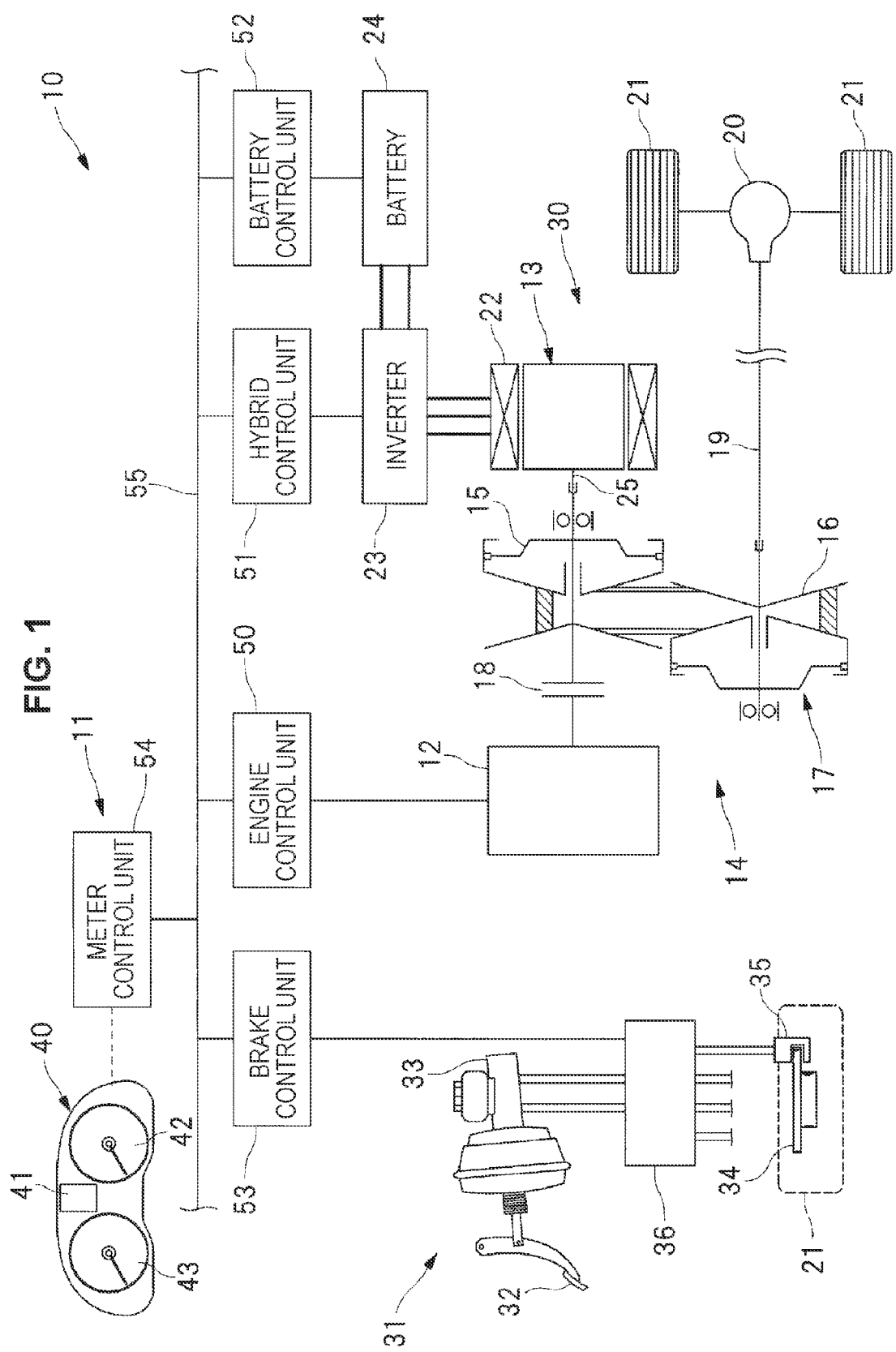
FIG. 1 is a schematic view of an example configuration of a hybrid vehicle.

Hereinafter, a preferred implementation of the present disclosure will be described in detail with reference to the appended drawings. Note that, in this specification and the appended drawings, structural elements that have substantially the same function and structure are denoted with the same reference numerals, and repeated explanation of these structural elements is omitted.

The implementation of the present disclosure is described below in detail with reference to the drawings. FIG. 1 is a schematic view of an example configuration of a hybrid vehicle (electric vehicle) 10. The hybrid vehicle 10 illustrated in FIG. 1 is provided with a vehicle display device 11, which is an implementation of the present disclosure.

As illustrated in FIG. 1, the hybrid vehicle 10 is equipped with a power unit 14 including an engine 12 and a motor/generator 13, which serve as power sources. This power unit 14 is provided with a continuously variable transmission 17 including a primary pulley 15 and a secondary pulley 16. The engine 12 is linked to one side of the primary pulley 15 via a clutch 18, and the motor/generator 13 is linked to the other side of the primary pulley 15. Wheels 21 are linked to the secondary pulley 16 via an output axis 19, a differential mechanism 20, and the like. In addition, a battery 24 is connected to a stator 22 of the motor/generator 13 via an inverter 23.

The hybrid vehicle 10 is provided with a regenerative brake 30 and a friction brake 31, which serve as a brake system that brakes the wheels 21. The regenerative brake 30 includes the motor/generator (electric motor) 13 mechanically connected to the wheels 21 and the battery (electrical storage device) 24 electrically connected to the motor/generator 13. In actuating the regenerative brake 30, the motor/generator 13 is controlled to be put in a power generation state. Thus, the motor/generator 13 can generate braking power to brake the wheels 21. This regenerative brake 30 converts the kinetic energy of the hybrid vehicle 10 to electrical energy and collects the electrical energy by causing the motor/generator 13 to regenerate energy and charging the battery 24.

The friction brake 31 includes a master cylinder 33 that generates brake hydraulic pressure in conjunction with a brake pedal 32, and a caliper 35 that brakes a disc rotor 34 of each wheel 21 by the brake hydraulic pressure from the master cylinder 33. The friction brake 31 also includes a hydraulic unit 36 including an electric pump, an accumulator, an electromagnetic valve, and the like. The hydraulic unit 36 is provided between the master cylinder 33 and the caliper 35, and the brake hydraulic pressure controlled by the hydraulic unit 36 is supplied to each caliper 35. When a driver depresses the brake pedal 32, the brake hydraulic pressure is supplied to the caliper 35 via the hydraulic unit 36. Thus, a pad (not illustrated) of the caliper 35 is pressed against the disc rotor 34, and friction between the pad and the disc rotor 34 can brake the wheel 21. In this manner, the friction brake 31 converts the kinetic energy of the hybrid vehicle 10 to thermal energy and releases the thermal energy.

Figure 2:
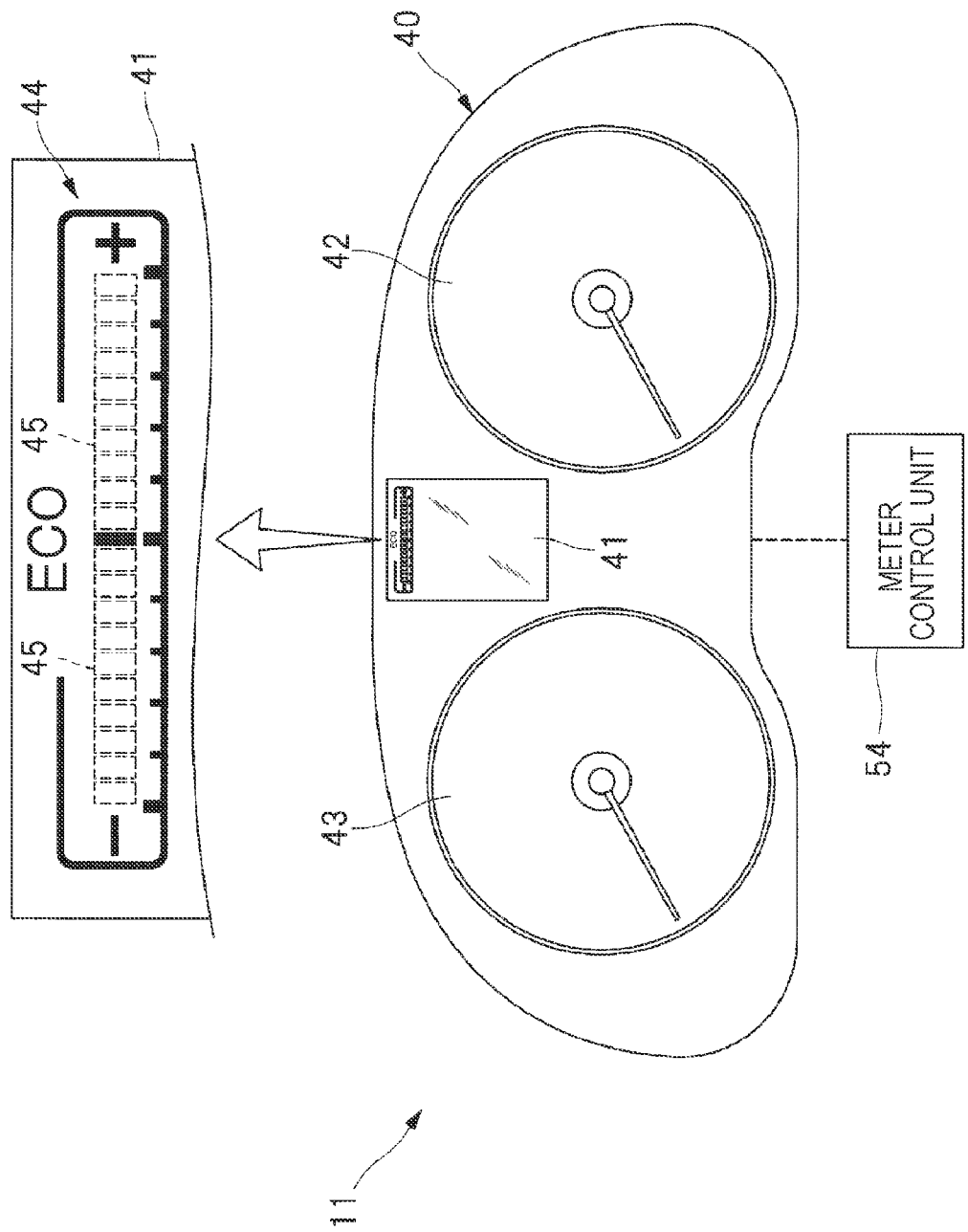
FIG. 2 is a schematic view of an example of a vehicle display device.

FIG. 2 is a schematic view of an example of the vehicle display device 11. As illustrated in FIG. 2, the vehicle display device 11 is provided with a combination meter 40 that displays various kinds of information to the driver. The combination meter 40 includes a display (onboard display) 41, such as a liquid crystal panel, a speed meter 42 that displays vehicle speed, a tachometer 43 that displays engine speed, and the like. As illustrated in the enlarged part of FIG. 2, an ECO gauge 44 is displayed on the display 41 of the combination meter 40. This ECO gauge 44 displays information on the level of energy efficiency of the hybrid vehicle 10. Here, high energy efficiency, i.e., good energy efficiency, means low power consumption and fuel consumption per unit travel distance, and low energy efficiency, i.e., poor energy efficiency, means high power consumption and fuel consumption per unit travel distance.

Figure 3A:
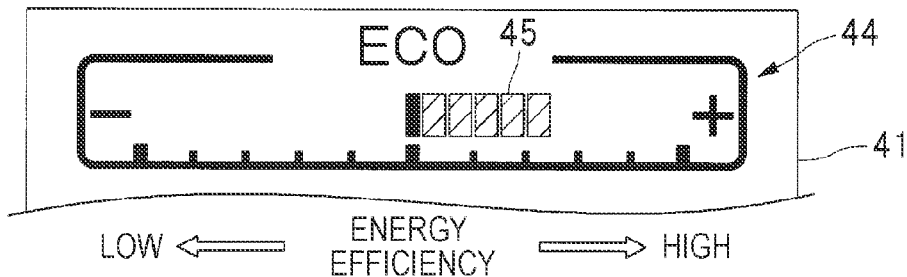
FIGS. 3A to 3D illustrate display situations of an ECO gauge.
Figure 3B:
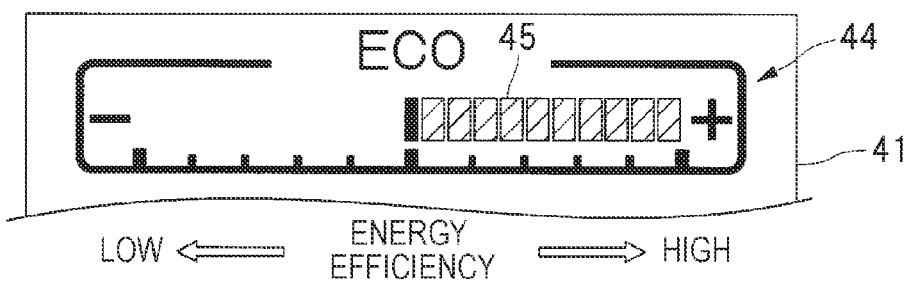
Figure 3C:
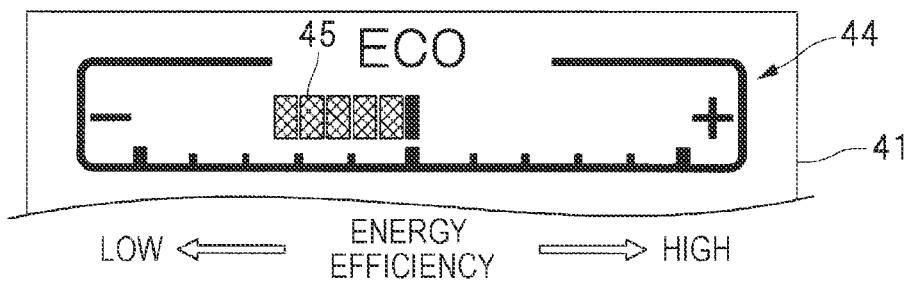
Figure 3D:
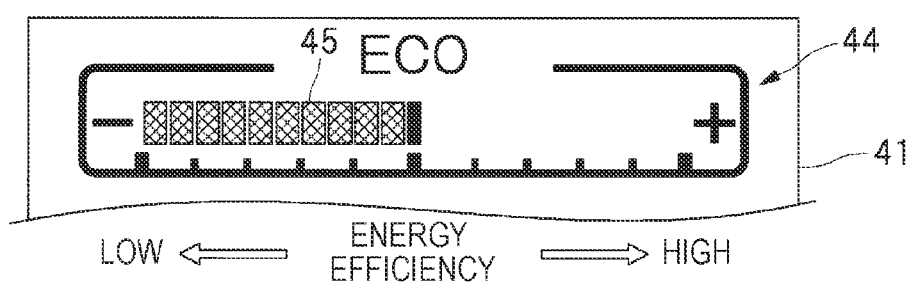

FIGS. 3A to 3D illustrate display situations of the ECO gauge 44. As illustrated in FIGS. 3A and 3B, when driving operation that improves energy efficiency is performed, a display bar 45 extending to the positive side (+ side) is displayed. As illustrated in FIGS. 3C and 3D, when driving operation that lowers energy efficiency is performed, the display bar 45 extending to the negative side (− side) is displayed. Note that the displayed display bar 45 extends longer to the positive side as the energy efficiency increases, as illustrated in FIG. 3B, and extends longer to the negative side as the energy efficiency decreases, as illustrated in FIG. 3D.

Next, a control system of the hybrid vehicle 10 is described. As illustrated in FIG. 1, the hybrid vehicle 10 includes a plurality of electronic control units 50 to 54. As the electronic control units, the engine control unit 50 that controls the engine 12, the hybrid control unit 51 that controls the motor/generator 13 and the like, and the battery control unit 52 that controls the battery 24 are provided. In addition, as the electronic control units, the brake control unit 53 that controls the friction brake 31, the meter control unit 54 that controls the combination meter 40, and the like are provided. These electronic control units 50 to 54 include a microcomputer including a CPU, a ROM, a RAM, and the like, a driving circuit that generates control current for various actuators, and the like. The electronic control units 50 to 54 are connected to each other via an in-vehicle network 55, such as a CAN. Furthermore, the in-vehicle network 55 receives signals indicating vehicle states, such as vehicle speed, engine speed, motor revolutions, an accelerator operation amount, and a brake operation amount, from various sensors (not illustrated).

The meter control unit 54 included in the vehicle display device 11 is described below. First, an overview of the control of the ECO gauge 44 by the meter control unit 54 is briefly described. The meter control unit 54 calculates the energy efficiency of the hybrid vehicle 10, on the basis of the travel distance of the hybrid vehicle 10 and energy consumed for the travel distance. The meter control unit 54 calculates, as the energy efficiency, an average energy efficiency in a first period and an instantaneous energy efficiency in a second period that is shorter than the first period. Then, the meter control unit 54 displays an efficiency difference between the average energy efficiency and the instantaneous energy efficiency on the ECO gauge 44 and encourages the driver to perform driving operation for increasing energy efficiency. That is, when the instantaneous energy efficiency obtained by current driving operation exceeds the average energy efficiency, the display bar 45 of the ECO gauge 44 extending to the positive side is displayed. When the instantaneous energy efficiency obtained by current driving operation falls below the average energy efficiency, the display bar 45 of the ECO gauge 44 extending to the negative side is displayed. Thus, the driver looking at the ECO gauge 44 can recognize driving operation that contributes to improved energy efficiency and the energy efficiency of the hybrid vehicle 10 can be improved.

Figure 4:
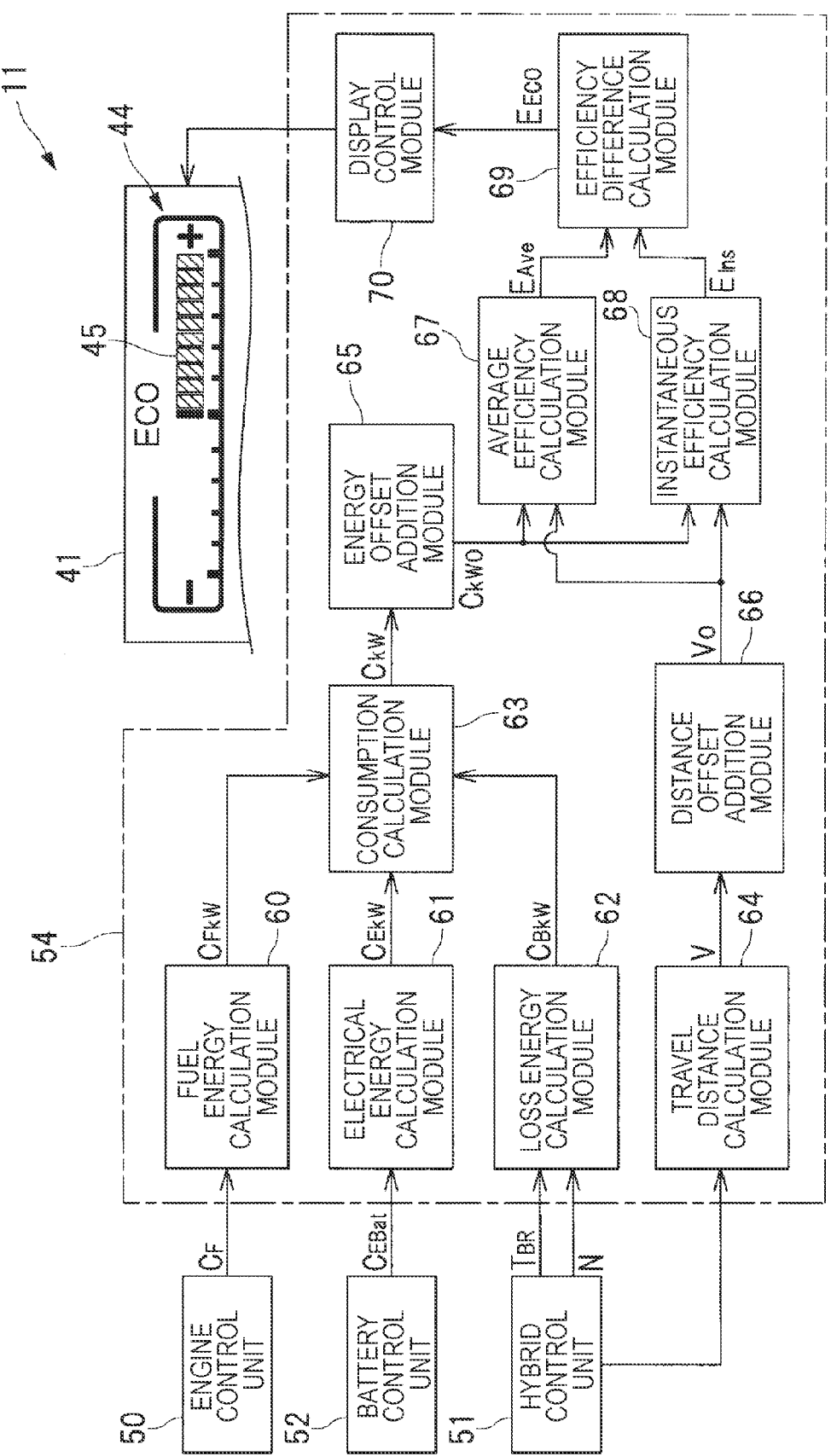
FIG. 4 is a block diagram illustrating an example of a function of a meter control unit.

Next, the control of the ECO gauge 44 by the meter control unit 54 is described in detail. FIG. 4 is a block diagram illustrating an example of a function of the meter control unit 54. As illustrated in FIG. 4, the meter control unit 54 includes a fuel energy calculation module 60. The fuel energy calculation module 60 calculates a fuel energy $C_{FkW}$ per unit time consumed by the engine 12. The fuel energy calculation module 60 receives a fuel consumption $C_F$ per unit time from the engine control unit 50. Then, as expressed by the following formula (1), the fuel energy calculation module 60 multiplies the fuel consumption $C_F$ by an energy quantity $k_{c2j}$ per unit volume to calculate the fuel energy $C_{FkW}$, which is heat quantity per unit time. In this manner, the fuel energy calculation module 60 calculates the fuel energy $C_{FkW}$ consumed by the hybrid vehicle 10, on the basis of the fuel consumption $C_F$ of the engine 12. Note that the fuel consumption $C_F$ is the amount of fuel injected from an injector (not illustrated) of the engine 12.

$$C_{FkW} [\text{kW}] = C_F [\text{cc/sec}] \times k_{c2j} [\text{kJ/cc}] \quad (1)$$

The meter control unit 54 includes an electrical energy calculation module 61. The electrical energy calculation module 61 calculates an electrical energy $C_{EkW}$ per unit time mainly consumed and regenerated by the motor/generator 13. The electrical energy calculation module 61 receives a charge/discharge power $C_{EBat}$ of the battery 24 per unit time from the battery control unit 52. Then, as expressed by the following formula (2), the electrical energy calculation module 61 calculates the charge/discharge power $C_{EBat}$ as the electrical energy $C_{EkW}$, which is heat quantity per unit time. Here, the charge/discharge power $C_{EBat}$ is detected to be a positive value in battery discharge, and detected to be a negative value in battery charge. That is, the consumed electrical energy $C_{EkW}$ is calculated as a positive value in battery discharge, and the regenerated (i.e., generated) electrical energy $C_{EkW}$ is calculated as a negative value in battery charge. In this manner, the electrical energy calculation module 61 calculates the electrical energy $C_{EkW}$ consumed or generated by the hybrid vehicle 10, on the basis of the charge/discharge power $C_{EBat}$ of the battery 24.

$$C_{EkW} [\text{kW}] = C_{EBat} [\text{kW}] \quad (2)$$

The meter control unit 54 includes a loss energy calculation module 62. The loss energy calculation module 62 calculates a loss energy $C_{BkW}$ per unit time released mainly from the friction brake 31. The loss energy calculation module 62 receives a total braking torque $T_{Total}$, a regenerative torque $T_{BR}$, and motor revolutions N from the hybrid control unit 51. Then, as expressed by the following formula (3), the loss energy calculation module 62 subtracts the regenerative torque $T_{BR}$ from the total braking torque $T_{Total}$ and multiplies the resulting value by the motor revolutions N and a conversion factor $k_{T2P}$, thereby calculating the loss energy $C_{BkW}$, which is heat quantity per unit time. In this manner, the loss energy calculation module 62 estimates an actuation state of the friction brake 31 from the total braking torque $T_{Total}$ and the regenerative torque $T_{BR}$, and calculates the loss energy $C_{BkW}$ on the basis of the actuation state of the friction brake 31. That is, the loss energy calculation module 62 calculates the loss energy $C_{BkW}$ released from the hybrid vehicle 10 on the basis of the actuation state of the friction brake 31. Note that the total braking torque $T_{Total}$, which is braking torque that is required of the hybrid vehicle 10 in vehicle braking, is set on the basis of vehicle speed, the depression amount of the brake pedal 32, and the like. The regenerative torque $T_{BR}$ is regenerative torque that is generated by the motor/generator 13 in regenerative braking. The motor revolutions N indicate the revolving speed of the motor/generator 13, and the conversion factor $k_{T2P}$ is a factor for converting work to heat quantity. Note that the total braking torque $T_{Total}$ and the regenerative torque $T_{BR}$ are total braking torque and regenerative torque that act on a rotor axis 25 of the motor/generator 13.

$$C_{BkW}\text{[kW]}=(T_{Total}-T_{BR})\text{ [Nm]}\times N\text{ [rpm]}\times k_{T2P} \quad (3)$$

The meter control unit 54 includes a consumption calculation module 63. The consumption calculation module 63 calculates an energy consumption $C_{kW}$ per unit time consumed by the hybrid vehicle 10. The consumption calculation module 63 receives the fuel energy $C_{FkW}$, the electrical energy $C_{EkW}$, and the loss energy $C_{BkW}$ from the energy calculation modules 60 to 62. Then, as expressed by the following formula (4), the consumption calculation module 63 combines the fuel energy $C_{FkW}$, the electrical energy $C_{EkW}$, and the loss energy $C_{BkW}$ to calculate the energy consumption $C_{kW}$ per unit time.

$$C_{kW}\text{[kW]}=C_{FkW}\text{[kW]}+C_{EkW}\text{[kW]}+C_{BkW}\text{[kW]} \quad (4)$$

Here, the energy consumption $C_{kW}$ is a consumption obtained by adding energy whose recovery amount fluctuates in accordance with braking situations to energy consumed by the engine 12 and the motor/generator 13. In other words, the energy consumption $C_{kW}$ is a consumption obtained by adding the loss energy $C_{BkW}$ that would have been recovered depending on braking situations, i.e., the loss energy $C_{BkW}$ that is not recovered as power by the regenerative brake 30 but released as heat by the friction brake 31.

Therefore, in decelerating the hybrid vehicle 10, when the depression amount of the brake pedal 32 is small or the depression speed of the brake pedal 32 is low, the proportion of the friction brake 31 to the total braking torque lowers; thus, the loss energy $C_{BkW}$ decreases and the energy consumption $C_{kW}$ decreases. In other words, when the brake pedal 32 is depressed lightly, the proportion of the regenerative brake 30 to the total braking torque rises; thus, the loss energy $C_{BkW}$ decreases and the energy consumption $C_{kW}$ decreases. In decelerating the hybrid vehicle 10, when the depression amount of the brake pedal 32 is large or the depression speed of the brake pedal 32 is high, the proportion of the friction brake 31 to the total braking torque rises; thus, the loss energy $C_{BkW}$ increases and the energy consumption $C_{kW}$ increases. In other words, when the brake pedal 32 is depressed strongly, the proportion of the regenerative brake 30 to the total braking torque lowers; thus, the loss energy $C_{BkW}$ increases and the energy consumption $C_{kW}$ increases. As described above, the energy consumption $C_{kW}$ takes into account the braking situations of the hybrid vehicle 10.

To calculate energy efficiency using this energy consumption $C_{kW}$, the meter control unit 54 includes a travel distance calculation module 64 that calculates a travel distance V per unit time. The travel distance calculation module 64 receives a vehicle-speed signal from the hybrid control unit 51, and calculates the travel distance V [km/sec] per unit time on the basis of the vehicle-speed signal. Note that the travel distance may be calculated on the basis of a position signal output from a global positioning system (GPS), for example, without use of a vehicle-speed signal.

Then, the meter control unit 54 divides the travel distance V by the energy consumption $C_{kW}$, and calculates the energy efficiency of the hybrid vehicle 10 as described above. However, the energy consumption $C_{kW}$ includes the electrical energy $C_{EkW}$, which becomes a negative value in battery charge, i.e., regenerative energy; therefore, the energy consumption $C_{kW}$ is assumed to vary across "0". Here, there is a problem in that, in calculating energy efficiency, energy efficiency scatters when the energy consumption $C_{kW}$, which is a denominator, passes through "0".

Thus, the meter control unit 54 includes an energy offset addition module 65 that raises the energy consumption $C_{kW}$ to update the energy consumption $C_{kW}$ to an energy consumption $C_{kWO}$. As expressed by the following formula (5), the energy offset addition module 65 serving as a consumption addition module adds an offset value $k_O$, which is a first addition value, to the energy consumption $C_{kW}$ to calculate the raised energy consumption $C_{kWO}$. That is, the offset value $k_O$ is set such that the energy consumption $C_{kWO}$ keeps a positive value even when the fuel energy $C_{FkW}$ and the loss energy $C_{BkW}$ are "0" and the electrical energy $C_{EkW}$ is calculated as a large negative value owing to regenerative braking.

$$C_{kWO}\text{[kW]}=C_{kW}\text{[kW]}+k_O \quad (5)$$

In the case of raising only the energy consumption $C_{kW}$ (denominator), calculation results of energy efficiency are assumed to differ. That is, in a situation where the energy consumption $C_{kW}$ and the travel distance V both approach "0", energy efficiency converges to "1" when the energy consumption $C_{kW}$ (denominator) has not been raised. In contrast, in the situation where the energy consumption $C_{kW}$ and the travel distance V both approach "0", energy efficiency converges to "0" when only the energy consumption $C_{kW}$ (denominator) has been raised. Thus, the meter control unit 54 includes a distance offset addition module 66 that raises the travel distance V, which is a numerator, to update the travel distance V to a travel distance $V_O$. As expressed by the following formula (6), the distance offset addition module 66 serving as a travel distance addition module adds an offset value $k_O$, which is a second addition value, to the travel distance V to calculate the raised travel distance $V_O$. In this manner, in the situation where the energy consumption $C_{kW}$ and the travel distance V both approach "0", energy efficiency can converge to "1" and thus energy efficiency can be calculated correctly.

$$V_O\text{ [km/sec]}=V\text{ [km/sec]}+k_O \quad (6)$$

In the above description, the same offset value $k_O$ is added to each of the energy consumption $C_{kW}$ and the travel distance V. That is, the first addition value and the second addition value are the same value. However, without being limited thereto, the first addition value and the second addition value may be set to different values. As described above, it is preferable to add the same offset value $k_O$ to the energy consumption $C_{kW}$ and the travel distance V because, in the situation where the energy consumption $C_{kW}$ and the travel distance V both approach "0", energy efficiency can converge to "1" and thus energy efficiency is calculated correctly. However, the first addition value and the second addition value may be set to different values within a range where display content of the ECO gauge 44 described later does not exhibit unnatural operation. In this case, in the situation where the energy consumption $C_{kW}$ and the travel distance V both approach "0", energy efficiency converges to "1.1" or "0.9", for example, instead of "1".

Note that as expressed by the above formula (6), a unit system of the travel distance $V_O$ collapses because the offset value $k_O$ [kW] is added to the travel distance V [km/sec]. However, as will be described later, a value displayed on the ECO gauge 44 is not the travel distance $V_O$ but an efficiency difference between the average energy efficiency and the instantaneous energy efficiency. Therefore, display content of the ECO 44 does not exhibit unnatural operation.

In addition, the meter control unit 54 includes an average efficiency calculation module 67 serving as a first efficiency calculation module. The average efficiency calculation module 67 receives the energy consumption $C_{kWO}$ from the energy offset addition module 65 and the travel distance $V_O$ from the distance offset addition module 66. Then, the average efficiency calculation module 67 adds up the energy consumption $C_{kWO}$ throughout a first period to calculate an energy consumption $C_{Total}$, and adds up the travel distance $V_O$ throughout the first period to calculate a travel distance $D_{Total}$. Then, as expressed by the following formula (7), the average efficiency calculation module 67 divides the travel distance $D_{Total}$ by the energy consumption $C_{Total}$ to calculate an average energy efficiency $E_{Ave}$, which is a first energy efficiency. Note that the first period may be, for example, a period from the reset of a tripmeter that adds up travel distance to the current time, or a period from the operation of turning on an ignition switch to the current time. Alternatively, the latest predetermined time, such as the latest ten minutes, the latest one hour, or the latest ten hours, may be set as the first period, for example.

$$E_{Ave} \text{ [km/kJ]} = D_{Total} \text{ [km]} \div C_{total} \text{ [kJ]} \qquad (7)$$

The meter control unit 54 includes an instantaneous efficiency calculation module 68 serving as a second efficiency calculation module. The instantaneous efficiency calculation module 68 receives the energy consumption $C_{kWO}$ from the energy offset addition module 65 and the travel distance $V_O$ from the distance offset addition module 66. Then, the instantaneous efficiency calculation module 68 adds up the energy consumption $C_{kWO}$ throughout a second period that is shorter than the first period to calculate an energy consumption $C_{Ins}$, and adds up the travel distance $V_O$ throughout the second period to calculate a travel distance $D_{Ins}$. Then, as expressed by the following formula (8), the instantaneous efficiency calculation module 68 divides the travel distance Dins by the energy consumption $C_{Ins}$ to calculate an instantaneous energy efficiency $E_{Ins}$, which is a second energy efficiency. Note that examples of the second period include the latest 0.1 seconds, the latest 0.2 seconds, and the latest 1 second. As described above, a period shorter than the first period for calculating the average energy efficiency $E_{Ave}$ is set as the second period for calculating the instantaneous energy efficiency $E_{Ins}$.

$$E_{Ins} \text{ [km/kJ]} = D_{Ins} \text{ [km]} \div C_{Ins} \text{ [kJ]} \qquad (8)$$

The meter control unit 54 includes an efficiency difference calculation module 69 and a display control module 70. The efficiency difference calculation module 69 receives the average energy efficiency $E_{Ave}$ from the average efficiency calculation module 67 and the instantaneous energy efficiency $E_{Ins}$ from the instantaneous efficiency calculation module 68. Then, as expressed by the following formula (9), the efficiency difference calculation module 69 subtracts the average energy efficiency $E_{Ave}$ from the instantaneous energy efficiency $E_{Ins}$ to calculate a gauge arithmetic value $E_{ECO}$, which is an efficiency difference. Next, the display control module 70 controls the display content of the ECO gauge 44, i.e., the length and direction of the display bar 45, on the basis of the gauge arithmetic value $E_{ECO}$. That is, when the instantaneous energy efficiency $E_{Ins}$ obtained by current driving operation is large and the gauge arithmetic value $E_{ECO}$ is calculated to be positive, the display bar 45 of the ECO gauge 44 extending to the positive side is displayed. When the instantaneous energy efficiency $E_{Ins}$ obtained by current driving operation is small and the gauge arithmetic value $E_{ECO}$ is calculated to be negative, the display bar 45 of the ECO gauge 44 extending to the negative side is displayed. Thus, the driver looking at the ECO gauge 44 can recognize driving operation that contributes to improved energy efficiency and the energy efficiency of the hybrid vehicle 10 can be improved.

$$E_{ECO} \text{ [km/kJ]} = E_{ins} \text{ [km/kJ]} - E_{Ave} \text{ [km/kJ]} \qquad (9)$$

As described above, the energy consumption $C_{kW}$, which serves as a basis for calculating the gauge arithmetic value $E_{ECO}$, takes into account the loss energy $C_{BkW}$ released from the hybrid vehicle 10. Using this energy consumption $C_{kW}$ allows the gauge arithmetic value $E_{ECO}$ to reflect usage proportions of the regenerative brake 30 and the friction brake 31, which fluctuate in accordance with driving operation. Thus, the driver looking at the ECO gauge 44 can recognize driving operation that contributes to improved energy efficiency, i.e., driving operation that contributes to lowered usage proportion of the friction brake 31, and the energy efficiency of the hybrid vehicle 10 can be improved.

Here, the usage proportion of the regenerative brake 30 to the total braking torque greatly fluctuates depending on driving operation, i.e., how the brake pedal 32 is depressed. That is, when the brake pedal 32 is depressed lightly with allowance in vehicle braking, the total braking torque is set small and thus the proportion of the friction brake 31 to the total braking torque can be lowered. By thus lowering the usage proportion of the friction brake 31 in vehicle braking, the loss energy $C_{BkW}$ released from the friction brake 31 can be reduced; thus, the energy consumption $C_{kW}$ can be reduced and energy efficiency can be increased. In this case, the gauge arithmetic value $E_{ECO}$ becomes more likely to be calculated to be positive as the energy consumption $C_{kW}$ is reduced; therefore, the driver can recognize light brake operation, which serves to improve energy efficiency.

When the brake pedal 32 is depressed suddenly in vehicle braking, the total braking torque is set large and thus the proportion of the friction brake 31 to the total braking torque rises. When the usage proportion of the friction brake 31 thus rises in vehicle braking, the loss energy $C_{BkW}$ released from the friction brake 31 increases; thus, the energy consumption $C_{kW}$ increases and energy efficiency lowers. In this case, the gauge arithmetic value $E_{ECO}$ becomes more likely to be calculated to be negative as the energy consumption $C_{kW}$ increases; therefore, the driver can recognize sudden brake operation, which serves to degrade energy efficiency.

Figure 5:
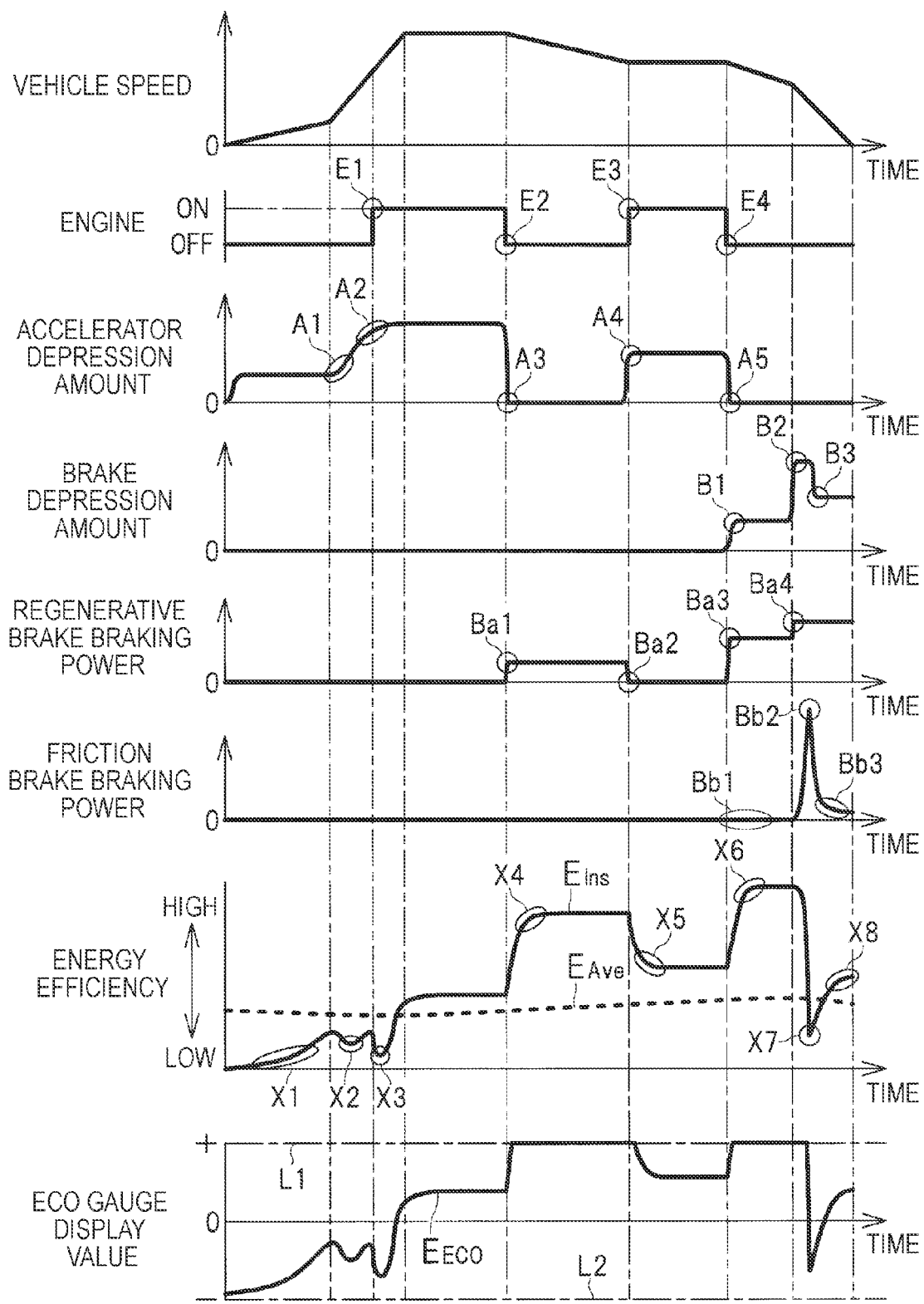
FIG. 5 is a conceptual diagram illustrating an example of a display behavior of an ECO gauge.

A display behavior of the ECO gauge 44 from vehicle start to vehicle stop is described below. FIG. 5 is a conceptual diagram illustrating an example of the display behavior of the ECO gauge 44. As illustrated in FIG. 5, after start, the instantaneous energy efficiency $E_{Ins}$ increases gradually (X1) because the travel distance extends with the increase in vehicle speed. Then, when the depression amount of an accelerator pedal is increased (A1), energy consumption increases and the instantaneous energy efficiency $E_{Ins}$ decreases (X2). When the depression amount of the accelerator pedal is further increased (A2), energy consumption increases and the instantaneous energy efficiency $E_{Ins}$ decreases (X3) because the engine 12 starts (E1).

Next, when the accelerator pedal is released (A3), the hybrid vehicle 10 travels in a coast state of decelerating gradually. In this coast travel, the engine 12 stops (E2) and the regenerative brake 30 is actuated (Ba1). Thus, regenerated electrical energy (hereinafter called regenerative energy) increases; therefore, energy consumption decreases and the instantaneous energy efficiency $E_{Ins}$ increases (X4). When the accelerator pedal is depressed during the coast travel (A4), the engine 12 restarts (E3) and the regenerative brake 30 stops (Ba2). Thus, energy consumption increases and the instantaneous energy efficiency $E_{Ins}$ decreases (X5).

Then, the accelerator pedal is released (A5) and the brake pedal 32 is depressed lightly (B1) for deceleration toward vehicle stop. When the brake pedal 32 is depressed lightly in this manner, the engine 12 stops (E4), and the braking power of the regenerative brake 30 comes up (Ba3) in a state where the braking power of the friction brake 31 is held at "0" (Bb1). In this case, energy consumption decreases drastically and the instantaneous energy efficiency $E_{Ins}$ increases significantly (X6) because regenerative energy increases while loss energy is suppressed to "0".

When the depression amount of the brake pedal 32 is increased (B2) to stop the hybrid vehicle 10, the total braking torque of the hybrid vehicle 10 is brought high. To obtain this total braking torque, which is a target value, the braking power of the regenerative brake 30 is increased (Ba4), but the braking power of the regenerative brake 30 is limited by received current of the battery 24, for example; therefore, the braking power of the friction brake 31 comes up (Bb2) to compensate for the lack of braking power. In this case, energy consumption increases and the instantaneous energy efficiency $E_{Ins}$ decreases (X7) because loss energy increases with the actuation of the friction brake 31. Furthermore, in the illustrated example, the driver eases up on the brake pedal 32 (B3) immediately before stop. Therefore, the total braking torque of the hybrid vehicle 10 is brought low, and the braking power of the friction brake 31 having been compensating for the lack of braking power is brought low (Bb3). Loss energy decreases as the braking power of the friction brake 31 is brought low; thus, energy consumption decreases and the instantaneous energy efficiency $E_{Ins}$ increases (X8).

As described above, the instantaneous energy efficiency $E_{Ins}$ greatly fluctuates depending on the operation situations of the accelerator pedal and the brake pedal 32. When the instantaneous energy efficiency $E_{Ins}$ obtained by current driving operation is high and the gauge arithmetic value $E_{ECO}$ is calculated to be positive, the display bar 45 corresponding to the gauge arithmetic value $E_{ECO}$ and extending to the positive side is displayed on the ECO gauge 44. When the instantaneous energy efficiency $E_{Ins}$ obtained by current driving operation is low and the gauge arithmetic value $E_{ECO}$ is calculated to be negative, the display bar 45 corresponding to the gauge arithmetic value $E_{ECO}$ and extending to the negative side is displayed on the ECO gauge 44. Thus, the driver looking at the ECO gauge 44 can recognize driving operation that contributes to improved energy efficiency and the energy efficiency of the hybrid vehicle 10 can be improved. Note that the ECO gauge 44 has a positive limiting value L1 and a negative limiting value L2, and the gauge arithmetic value $E_{ECO}$ is displayed within a range defined by these limiting values.

The present disclosure is not limited to the above implementation, and various alterations may occur insofar as they are within the scope of the present disclosure. In the above description, the parallel-type hybrid vehicle 10 is equipped with the vehicle display device 11. Without being limited thereto, for example, a series-type or series/parallel-type hybrid vehicle may be equipped with the vehicle display device 11. In a series-type or series/parallel-type hybrid vehicle, an electric motor is not only driven to generate power in regenerative braking, but also driven to generate power by an engine.

In the above description, the hybrid vehicle 10 is equipped with the vehicle display device 11. Without being limited thereto, an electric vehicle without the engine 12, such as an electric car or a fuel-cell car, may be equipped with the vehicle display device 11. In this case, the fuel energy calculation module 60 is omitted from the meter control unit 54. The consumption calculation module 63 of the meter control unit 54 combines the electrical energy $C_{EkW}$ and the loss energy $C_{BkW}$ to calculate the energy consumption $C_{kW}$ per unit time.

In the above description, in calculating the loss energy $C_{BkW}$, the regenerative torque $T_{BR}$ is subtracted from the total braking torque $T_{Total}$, and the resulting value is multiplied by the motor revolutions N and the conversion factor $k_{T2P}$. Without being limited thereto, for example, brake hydraulic pressure supplied to the caliper 35 may be detected and the loss energy $C_{BkW}$ may be calculated on the basis of the value of this brake hydraulic pressure. That is, the loss energy $C_{BkW}$ may be calculated on the basis of an actuation state of the friction brake 31 that is directly detected.

In the above description, the fuel energy $C_{FkW}$, the electrical energy $C_{EkW}$, and the loss energy $C_{BkW}$ are calculated by conversion to "kW", i.e., heat quantity "kJ" per unit time. Without being limited thereto, for example, the fuel energy $C_{FkW}$, the electrical energy $C_{EkW}$, and the loss energy $C_{BkW}$ may be calculated by conversion to another heat quantity, such as calories.

In the above description, the offset value $k_O$ is added to the energy consumption $C_{kW}$ and the offset value $k_O$ is added to the travel distance V. Without being limited thereto, for example, the instantaneous energy efficiency $E_{Ins}$ and the average energy efficiency $E_{Ave}$ may be calculated without raising the energy consumption $C_{kW}$ and the travel distance V in the case where unnatural operation, which might be exhibited by the ECO gauge 44 in a specific travel situation when the energy consumption $C_{kW}$ and the travel distance V are not raised, is allowable or can be suppressed by another method.

In the above description, the gauge arithmetic value $E_{ECO}$ (efficiency difference) is calculated by subtracting the average energy efficiency $E_{Ave}$ from the instantaneous energy efficiency $E_{Ins}$. Without being limited thereto, the gauge arithmetic value $E_{ECO}$ (efficiency difference) may be calculated by subtracting the instantaneous energy efficiency $E_{Ins}$ from the average energy efficiency $E_{Ave}$.

In the above description, in calculating energy efficiency, the travel distance is divided by the energy consumption. Without being limited thereto, energy efficiency can be calculated by dividing the energy consumption by the travel distance. In this case, larger energy efficiency values indicate worse energy efficiency and smaller energy efficiency values indicate better energy efficiency.

In the above description, the onboard display is the display 41 that displays the ECO gauge 44. Without being limited thereto, for example, the onboard display may be an analog or digital meter whose indicating needle is operated on the basis of the gauge arithmetic value $E_{ECO}$, or a light-emitting body whose color and blinking pattern are switched on the basis of the gauge arithmetic value $E_{ECO}$.

In the above description, a disc brake is adopted as the friction brake 31. Without being limited thereto, a drum brake may be adopted. Furthermore, a hydraulic friction brake that controls the caliper 35 by brake hydraulic pressure is adopted as the friction brake 31. Without being limited thereto, an electric friction brake that controls the caliper 35 by an electric actuator may be adopted.

Although the preferred implementation of the present disclosure has been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

The invention claimed is:

1. A vehicle display device for an electric vehicle including a friction brake, the vehicle display device comprising:
    an onboard display, equipped in the electric vehicle, wherein the onboard display is configured to display at least a display content to a driver of the electric vehicle, and
    a control unit configured to:
    calculate a loss energy, being an amount of energy released as heat by the friction brake in an application of a brake of the electric vehicle and unrecovered by a regenerative brake as power for the electric vehicle, on the basis of at least an actuation state of the friction brake;
    calculate an energy consumption per unit time consumed by the electric vehicle on the basis of at least the loss energy;
    calculate a first energy consumption in a first period on the basis of at least the energy consumption per unit time;
    calculate a second energy consumption in a second period shorter than the first period on the basis of at least the energy consumption per unit time;
    calculate a first energy efficiency on the basis of at least a first travel distance of the electric vehicle in the first period and the first energy consumption;
    calculate a second energy efficiency on the basis of at least a second travel distance of the electric vehicle in the second period and the second energy consumption; and
    control the display content of the onboard display on the basis of at least an efficiency difference between the first energy efficiency and the second energy efficiency.

2. The vehicle display device according to claim 1, wherein the control unit is further configured to calculate an electrical energy consumed or generated by the electric vehicle on the basis of at least a charge or a discharge power of an electrical storage device included in the electric vehicle, wherein the energy consumption per unit time is calculated on the basis of at least one of the loss energy or the electrical energy.

3. The vehicle display device according to claim 2, wherein the control unit is further configured to calculate a fuel energy consumed by the electric vehicle on the basis of at least an amount of fuel injected from an engine included in the electric vehicle, wherein the energy consumption per unit time is calculated on the basis of at least one of the loss energy, the electrical energy, or the fuel energy.

4. The vehicle display device according to claim 3, wherein the electrical energy is calculated as a heat quantity, and the fuel energy is calculated as a heat quantity.

5. The vehicle display device according to claim 4, wherein the control unit is further configured to add a first addition value to the energy consumption per unit time to update the energy consumption per unit time, and wherein the first energy efficiency is calculated based on at least the updated energy consumption per unit time.

6. The vehicle display device according to claim 5, wherein the control unit is further configured to add a second addition value to the first travel distance to update the first travel distance to an updated first travel distance, and wherein the first energy efficiency is calculated based on at least the updated first travel distance.

7. The vehicle display device according to claim 6, wherein the first addition value and the second addition value are a same value.

8. The vehicle display device according to claim 3, wherein the control unit is further configured to add a first addition value to the energy consumption per unit time to update the energy consumption per unit time, and wherein the first energy efficiency is calculated based on at least the updated energy consumption per unit time.

9. The vehicle display device according to claim 8, wherein the control unit is further configured to add a second addition value to the first travel distance to update the first travel distance to an updated first travel distance, and wherein the first energy efficiency is calculated based on at least the updated first travel distance.

10. The vehicle display device according to claim 9, wherein the first addition value and the second addition value are a same value.

11. The vehicle display device according to claim 2, wherein the electrical energy is calculated as a heat quantity.

12. The vehicle display device according to claim 11, wherein the control unit is further configured to add a first addition value to the energy consumption per unit time to update the energy consumption per unit time, and wherein the first energy efficiency is calculated based on at least the updated energy consumption per unit time.

13. The vehicle display device according to claim 12, wherein the control unit is further configured to add a second addition value to the first travel distance to update the first travel distance to an updated first travel distance, and wherein the first energy efficiency is calculated based on at least the updated first travel distance.

14. The vehicle display device according to claim 13, wherein the first addition value and the second addition value are a same value.

15. The vehicle display device according to claim 2, wherein the control unit is further configured to add a first addition value to the energy consumption per unit time to update the energy consumption per unit time, and wherein the first energy efficiency is calculated based on at least the updated energy consumption per unit time.

16. The vehicle display device according to claim 15, wherein the control unit is further configured to add a second addition value to the first travel distance to update the first travel distance, and wherein the first energy efficiency is calculated based on at least the updated first travel distance.

17. The vehicle display device according to claim 16, wherein the first addition value and the second addition value are a same value.

18. The vehicle display device according to claim 1, wherein the control unit is further configured to add a first addition value to the energy consumption per unit time to update the energy consumption per unit time, and wherein the first energy efficiency is calculated based on at least the updated energy consumption per unit time.

19. The vehicle display device according to claim 18, wherein the control unit is further configured to add a second addition value to the first travel distance to update the first travel distance, and wherein the first energy efficiency is calculated based on at least the updated first travel distance.

20. The vehicle display device according to claim 19, wherein the first addition value and the second addition value are a same value.

21. A vehicle display device for an electric vehicle including a friction brake, the vehicle display device comprising:
an onboard display, equipped in the electric vehicle, wherein the onboard display is configured to display at least a display content to a driver of the electric vehicle, and
a control unit configured to:
calculate a loss energy, released from the electric vehicle, based on at least a resulting value obtained by subtraction of a regenerative torque generated by a motor or a generator in an application of a brake of the electric vehicle from a total braking torque required in the application of the brake of the electric vehicle;
calculate an energy consumption per unit time consumed by the electric vehicle on the basis of at least the loss energy;
calculate a first energy consumption in a first period on the basis of at least the energy consumption per unit time;
calculate a second energy consumption in a second period shorter than the first period on the basis of at least the energy consumption per unit time;
calculate a first energy efficiency on the basis of at least a first travel distance of the electric vehicle in the first period and the first energy consumption;
calculate a second energy efficiency on the basis of at least a second travel distance of the electric vehicle in the second period and the second energy consumption; and
control the display content of the onboard display on the basis of at least an efficiency difference between the first energy efficiency and the second energy efficiency.

22. A vehicle display device for an electric vehicle including a friction brake, the vehicle display device comprising:
an onboard display, equipped in the electric vehicle, wherein the onboard display is configured to display at least a display content to a driver of the electric vehicle, and
a control unit configured to:
calculate a loss energy, released from the electric vehicle, based on at least a brake hydraulic pressure supplied to the friction brake;
calculate an energy consumption per unit time consumed by the electric vehicle on the basis of at least the loss energy;
calculate a first energy consumption in a first period on the basis of at least the energy consumption per unit time;
calculate a second energy consumption in a second period shorter than the first period on the basis of at least the energy consumption per unit time;
calculate a first energy efficiency on the basis of at least a first travel distance of the electric vehicle in the first period and the first energy consumption;
calculate a second energy efficiency on the basis of at least a second travel distance of the electric vehicle in the second period and the second energy consumption; and
control the display content of the onboard display on the basis of at least an efficiency difference between the first energy efficiency and the second energy efficiency.

23. A vehicle display device for an electric vehicle including a friction brake, the vehicle display device comprising:
an onboard display, equipped in the electric vehicle, wherein the onboard display is configured to display a display content to a driver of the electric vehicle, and
a control unit configured to:
calculate a loss energy released from the electric vehicle on the basis of at least an actuation state of the friction brake;
calculate an energy consumption per unit time consumed by the electric vehicle on the basis of at least the loss energy;
update the energy consumption per unit time to an updated energy consumption per unit time by addition of a first addition value to the energy consumption per unit time;
calculate a first energy consumption in a first period on the basis of at least the updated energy consumption per unit time;
calculate a second energy consumption in a second period shorter than the first period on the basis of at least the updated energy consumption per unit time;
calculate a first energy efficiency on the basis of at least a first travel distance of the electric vehicle in the first period and the first energy consumption;
calculate a second energy efficiency on the basis of at least a second travel distance of the electric vehicle in the second period and the second energy consumption; and
control the display content of the onboard display on the basis of at least an efficiency difference between the first energy efficiency and the second energy efficiency.

24. A vehicle display device for an electric vehicle including a friction brake, the vehicle display device comprising:
an onboard display, equipped in the electric vehicle, wherein the onboard display is configured to display a display content to a driver of the electric vehicle, and
a control unit configured to:
calculate a loss energy released from the electric vehicle on the basis of at least an actuation state of the friction brake;
calculate an energy consumption per unit time consumed by the electric vehicle on the basis of at least the loss energy;
update the energy consumption per unit time to an updated energy consumption per unit time by addition of a first addition value to the energy consumption per unit time;
calculate a first energy consumption in a first period on the basis of at least the updated energy consumption per unit time;
calculate a second energy consumption in a second period shorter than the first period on the basis of at least the updated energy consumption per unit time;
calculate a travel distance per unit time of the electric vehicle;
update the travel distance per unit time to an updated travel distance per unit time by adding a second addition value to the travel distance per unit time;
calculate a first travel distance of the electric vehicle in the first period on the basis of at least the updated travel distance per unit time;
calculate a second travel distance of the electric vehicle in the second period on the basis of at least the updated travel distance per unit time;
calculate a first energy efficiency on the basis of at least the first travel distance and the first energy consumption;

calculate a second energy efficiency on the basis of at least the second travel distance and the second energy consumption; and control the display content of the onboard display of the vehicle display device on the basis of at least an efficiency difference between the first energy efficiency and the second energy efficiency.

\* \* \* \* \*